United States Patent Office 3,684,749
Patented Aug. 15, 1972

3,684,749
ADHESIVE COMPOSITION FOR GUMMED TAPE
Haruhiko Arai, Narashino-shi, and Shoji Horin, Ichikawa-shi, Japan, assignors to Kao Soap Co., Ltd., Tokyo, Japan
No Drawing. Filed Oct. 27, 1969, Ser. No. 869,889
Claims priority, application Japan, Oct. 30, 1968, 43/79,124
Int. Cl. C08f 45/14, 45/24
U.S. Cl. 260—8    3 Claims

ABSTRACT OF THE DISCLOSURE

An adhesive composition composed of (a) 10–90 parts by weight of a water-insoluble copolymer of vinyl acetate and lower alkyl (C1 to C4) acrylate copolymerized at a mol ratio in the range of 90:10 to 10:90 and having a degree of polymerization of between 100 and 3,000, (b) 90–10 parts by weight of a resinate-type surface active agent, and (c) dextrin, gelatine or glue. The component (c) is mixed with components (a) and (b) such that the weight ratio of component (c) to the sum of components (a) plus (b) is between 1:99 and 80:20. The adhesive composition is preferably applied in the form of an aqueous solution having a solids content of from 3 to 30% by weight.

---

The present invention relates to a novel adhesive composition for gummed tape which will be advantageously employed for sealing paper boxes and corrugated cardboard boxes etc. and other packaging purposes.

In the prior gummed tapes, the adhesive composition is composed of one or more than two of natural gum materials such as glue, dextrin or gum arabic and water-soluble polymer substances such as polyvinyl alcohol. However, gummed tapes which utilize adhesive materials chiefly composed of natural gum substance have many drawbacks such as insufficient adhering strength, unsatisfactory durability against heat and coldness, and tendency to cause blocking, deterioration and decomposition during prolonged storage. On the other hand the adhesive materials composed of water-soluble synthetic polymer such as polyvinyl alcohol (which will be hereafter abbreviated as PVA) have the defect that they are insufficient in the adhering strength immediately after their application (initial adhering strength).

Recently an adhesive material composed of PVA mixed with alkali salts of alkyl sulfates in order to improve this initial adhering strength has been proposed. However, this adhesive material still shows insufficient adhering strength and undesirable blocking property, since the drawbacks inherent to PVA are not sufficiently overcome.

The purpose of this invention is to provide a novel adhesive composition for gummed tape which has high adhering strength to various articles and is free from blocking during storage.

It has now been found that the above purpose of this invention can be achieved by the combined use of a water-insoluble copolymer of vinyl acetate and lower alkyl acrylate(s) dissolved in a concentrated solution (usually 10–15 wt. percent; hereinafter all percentages will be expressed by weight) of a resinate-type surface active agent and dextrin, gelatine or glue.

The alkyl group present in the vinyl acetate/lower alkyl acrylate copolymer which will be used in this invention is a lower alkyl group having 1 to 4 carbon atoms, that is to say, methyl, ethyl, propyl or butyl. The ratio of copolymerization by mol of vinyl acetate (which will be hereinafter abbreviated as VAC) to lower alkyl acrylate is between 90:10 and 10:90, and the degree of polymerization is between 100 and 3,000.

The resinate-type surface active agents, which essentially consist of alkali metal resinates and which should be employed to solubilize said copolymer can be alkali metal resinates, alkali metal salts of rosin, distilled or purified tall oil (commonly referred to as rosin soap), or adducts of these compounds with an $\alpha,\beta$-unsaturated polybasic acid such as maleic acid, for example, maleic rosin or alkali salts of such adducts.

The ratio of said copolymer to said resinate-type surface active agent in the adhesive composition according to this invention should be generally between 10:90 and 90:10 by weight. Dextrin, gelatine or glue is added in such an amount that will make the ratio of these substances to the total solids of said copolymer and said surface active agent by weight to be between 1:99 and 80:20, preferably between 10:90 and 40:60.

The typical preferred process for preparing the adhesive composition according to this invention comprises dissolving a predetermined amount of the copolymer in the form of granules, chips or emulsion into a 10–15% concentrated solution of a resinate-type surface active agent, and adding a 10–40% aqueous solution of dextrin, gelatine or glue into the thus obtained solution.

The adhesive composition according to this invention can be advantageously applied in the state of an aqueous solution having a solid content of from 3 to 30%, but may also be used in a concentration outside said range if somewhat longer setting period or lower working efficiency can be ignored.

The present invention will be further described by the following examples.

EXAMPLE 1

Tests for adhering performance and blocking were carried out on the gummed tapes made from the following samples of various adhesive compositions.

(1) Samples (A) Aquaeous solutiion of adhesive composition containing 8% of VAc-ethyl acrylate (2:8) copolymer (degree of polymerization: ca. 1,000), 10% of rosin soap and 4.5% of glue.

(B) Aqueous solution of adhesive composition containing 8% of VAc-ethyl acrylate (2:8) copolymer (degree of polymerization: ca. 1,000), 10% of rosin soap and 4.5% of dextrin.

(C) Aqueous solution of adhesive composition containing 2.5% of VAc-butyl acrylate (5:5) copolymer (degree of polymerization: ca. 1,000), 10% of rosin soap and 2.5% of gelatine.

(D) Aqueous solution of adhesive composition containing 4.5% of VAc-butyl acrylate (5:5) copolymer (degree of polymerization; ca. 1,000), 10% of sodium resinate and 5.8% of gelatine.

(E) Aqueous solution of adhesive composition containing 8% of VAc-ethyl acrylate (2:8) copolymer (degree of polymerization: ca. 1,000), 10% of sodium salt of maleic rosin and 4.5% of gelatine.

(F) Aqueous solution of adhesive composition containing 2.9% of VAc (degree of polymerization: ca. 960), 10% of rosin soap and 5.2% of gelatine.

(G) Aqueous solution (ca. 20%) of a commercially available adhesive for gummed tape comprising a mixture of glue and dextrin in the ratio of 8:2.

(H) Aqueous solution of adhesive composition containing 30% of PVA (degree of polymerization: ca. 1,000) and 7% of sodium dodecyl sulfate.

(2) Preparation of gummed tape

Test pieces of gummed tape were prepared by applying the aqueous solutions shown in the above (1) on kraft paper in an amount of 15 g./m.$^2$ as solids.

(3) Test method of adhereing strength (carried out substantially according to the method described in JIS Z0218-1960)

A portion (2.5×5 cm.$^2$) of a test piece of 2.5×8 cm.$^2$ was moistened by placing thereon a wet sponge for 5 seconds and, 10 seconds later, pressed against the respective surfaces of various articles under a predetermined pressure applied by a roller, leaving the remaining area of 2.5×3 cm.$^2$ as the flap. After drying for 24 hours, said flap of the test piece was manually pulled into a direction perpendicular to the test piece thereby to peel off or strip said piece, and the peeled or stripped surfaces of the test piece and of the adhered article were inspected. Degree of destruction of the test piece was visually determined to the order of 10%, and the average value over three tests is shown in Table 1 as the index of adhering strength, wherein larger value indicates greater strength.

TABLE 1.—ADHERING STRENGTH OF VARIOUS ADHESIVE COMPOSITIONS TO VARIOUS ARTICLES (PERCENT)

| Sample | A | B | C | D | E | F | G | H |
|---|---|---|---|---|---|---|---|---|
| Kinds of articles: | | | | | | | | |
| Paper (liner for corrugated cardboard) | 100 | 100 | 100 | 100 | 100 | 100 | 100 | 0 |
| Wood (ash tree) | 30 | 70 | 30 | 90 | | 0 | 10 | 0 |
| Glass | 100 | 100 | 100 | 100 | 100 | | 100 | 0 |
| Stainless steel | 100 | 100 | 100 | 100 | | | 20 | 0 |
| Neoprene rubber | 100 | 100 | 100 | 100 | | | 100 | 0 |
| Polyvinyl chloride | 100 | 100 | 100 | 100 | 100 | 20 | 0 | 0 |
| Flame-treated polyethylene | 100 | 100 | 100 | 100 | | | 100 | 0 |
| Polypropylene | 100 | 100 | 80 | 60 | 50 | 30 | 0 | 0 |
| Polystyrene | 60 | 100 | 100 | 100 | 100 | 70 | 0 | 0 |
| Acrylic resin | 100 | 100 | 80 | 80 | | 30 | 0 | 0 |
| Phenol resin | 100 | 100 | 90 | 90 | | | 30 | 0 |
| Urea resin | 100 | 100 | | | 100 | | 30 | 0 |
| Melamine resin | 100 | 100 | 80 | | 100 | 50 | 0 | 0 |

Table 1 shows that the adhesive compositions obtained according to this invention (A–E) exert splendid adhering performance also to plastics and stainless steel.

(4) Test method for blocking (carried out substantially according to the method describd in JIS Z0219)

Test pieces (30 × 60 mm.) of gummed tapes were placed in a room kept at 40° C. and 65% RH for 30 minutes, then covered with polyethylene sheet and placed under an aluminum plate (45 × 30 mm.) of 1 mm. thick. After the application of load of 500 g. for 24 hours, the load required for T-peeling or T-stripping was determined. The results were as shown in Table 2, wherein the smaller figures indicate a lesser blocking tendency.

TABLE 2.—BLOCKING OF GUMMED TAPES

[Condition: 40° C., 65% RH and 35.7 g./cm.$^2$ for 24 hours]

| Sample: | Load required for peeling (g./30 mm.) |
|---|---|
| A | 50±20 |
| B | 25±14 |
| C | 90±25 |
| D | 45±20 |
| E | 70±20 |
| F | 200±20 |
| G | 220±25 |
| H | — |

Table 2 clearly shows that the gummed tapes prepared according to this invention are remarkably improved in blocking.

What we claim is:

1. An adhesive composition for gummed tape, consisting essentially of an aqueous solution of (1) a water-insoluble copolymer of vinyl acetate and a lower alkyl acrylate having an alkyl group of 1 to 4 carbon atoms, the mol ratio of vinyl acetate to lower alkyl acrylate in said copolymer being in the range of 10:90 to 90:10 and the degree of polymerization of said copolymer being in the range of about 100 to 3000, said copolymer being dissolved in (2) an aqueous solution of a resinate-type surface active agent selected from the group consisting of alkali metal resinate, alkali metal salts of rosin and purified tall oil, adducts of these compounds with maleic acid and alkali metal salts of such adducts, the weight ratio of said copolymer to said surface active agent, calculated as the solids, being between 90:10 and 10:90, said aqueous solution of said water-insoluble copolymer further containing (3) a substance selected from the group consisting of dextrin, gelatine and glue, the weight ratio of said substance to the sum of (1) plus (2), calculated as the solids, present in said aqueous solution being between 1:99 and 80:20 by weight.

2. The adhesive composition according to claim 1, in which the sum of (1), (2) and (3) in said composition is in the range of about 3 to 30 percent by weight and the balance is water.

3. The adhesive composition according to claim 1 wherein said ratio of said substance to the solids present in said aqueous copolymer solution is between 10:90 and 40:60 by weight.

References Cited

UNITED STATES PATENTS

| 2,624,715 | 1/1953 | Wildish | 260—17.4 |
| 2,676,121 | 4/1954 | Chapman | 117—138.8 |
| 2,956,973 | 10/1960 | Holdsworth | 260—29.6 |
| 3,200,091 | 8/1965 | Sederlund et al. | 260—8 |
| 3,365,320 | 1/1968 | Minelli | 106—133 |
| 3,419,465 | 12/1968 | Maruta | 162—168 |
| 3,451,890 | 6/1969 | Stump | 162—168 |
| 3,524,828 | 8/1970 | Keithley | 260—17 |

WILLIAM H. SHORT, Primary Examiner

L. L. LEE, Assistant Examiner

U.S. Cl. X.R.

117—122 PA, 155 UA, 156; 260—174 ST, 27 R, 296 R